United States Patent
Helge et al.

(10) Patent No.: US 9,386,741 B2
(45) Date of Patent: Jul. 12, 2016

(54) CUTTING DRUM FOR AGRICULTURAL MACHINE

(71) Applicant: AGCO International GmbH, Neuhausen am Rheinfall (CH)

(72) Inventors: Lindenmuller Helge, Windach (DE); Burkart Franz, Wildpoldsried (DE)

(73) Assignee: AGCO INTERNATIONAL GmbH, Neuhausen (CH)

( * ) Notice: Subject to any disclaimer, the term of this patent is extended or adjusted under 35 U.S.C. 154(b) by 15 days.

(21) Appl. No.: 14/185,544

(22) Filed: Feb. 20, 2014

(65) Prior Publication Data
US 2014/0311114 A1    Oct. 23, 2014

(30) Foreign Application Priority Data
Apr. 17, 2013  (GB) .................................. 1306964.6

(51) Int. Cl.
A01F 29/06    (2006.01)
A01D 34/52    (2006.01)
A01F 29/09    (2010.01)
A01D 34/43    (2006.01)

(52) U.S. Cl.
CPC ................ *A01D 34/52* (2013.01); *A01D 34/43* (2013.01); *A01F 29/095* (2013.01)

(58) Field of Classification Search
CPC ....... A01G 3/002; A01F 29/00; A01F 29/005; A01F 29/01; A01F 29/02; A01F 29/025; A01F 29/04; A01F 29/06; A01F 29/095; B02C 18/18
See application file for complete search history.

(56) References Cited

U.S. PATENT DOCUMENTS

| | | | | |
|---|---|---|---|---|
| 4,061,284 A * | 12/1977 | Raisbeck et al. | ............. | 241/294 |
| 4,209,137 A * | 6/1980 | McAllister et al. | ........... | 241/221 |
| 4,257,566 A * | 3/1981 | Lawrence | ...................... | 241/221 |
| 4,714,204 A * | 12/1987 | John et al. | ........................ | 241/55 |
| 5,544,826 A * | 8/1996 | Klingler et al. | ............... | 241/242 |
| 5,704,562 A * | 1/1998 | Wagstaff | ....................... | 241/294 |
| 5,878,970 A * | 3/1999 | Leeb | ............................. | 241/294 |
| 5,979,150 A | 11/1999 | Klingler | | |
| 6,405,954 B1 * | 6/2002 | Pakura | .......................... | 241/294 |
| 8,512,114 B2 * | 8/2013 | Birrell et al. | .................. | 460/112 |
| 2002/0029552 A1* | 3/2002 | Krone et al. | .................... | 56/500 |
| 2006/0130452 A1* | 6/2006 | Pakura | ....................... | 56/16.4 R |
| 2011/0240781 A1* | 10/2011 | Bacon | ........................ | 241/282.2 |

FOREIGN PATENT DOCUMENTS

| | | |
|---|---|---|
| EP | 0846412 A1 | 6/1998 |
| EP | 1269829 A1 | 1/2003 |
| GB | 204878 A | 10/1923 |

OTHER PUBLICATIONS

Search Report for Application No. GB13006964.6 dated Sep. 17, 2013.

* cited by examiner

*Primary Examiner* — Robert Pezzuto
*Assistant Examiner* — Adam Behrens

(57) ABSTRACT

A rotatable cutting drum comprising knife holders for attaching cutter knives thereto. Each knife holder comprises a forward member and a rear member and a knife connecting portion. The rear member extends from the connecting portion towards the rotational axis of the drum and has an extension member which extends circumferentially of the rotational axis in a direction opposite to the direction of rotation of the drum. The forward member extends from the connecting portion towards the drum rotation axis and abuts with the extension member of an adjacent knife holder positioned forward of the knife holder in the direction of rotation of the drum.

15 Claims, 6 Drawing Sheets

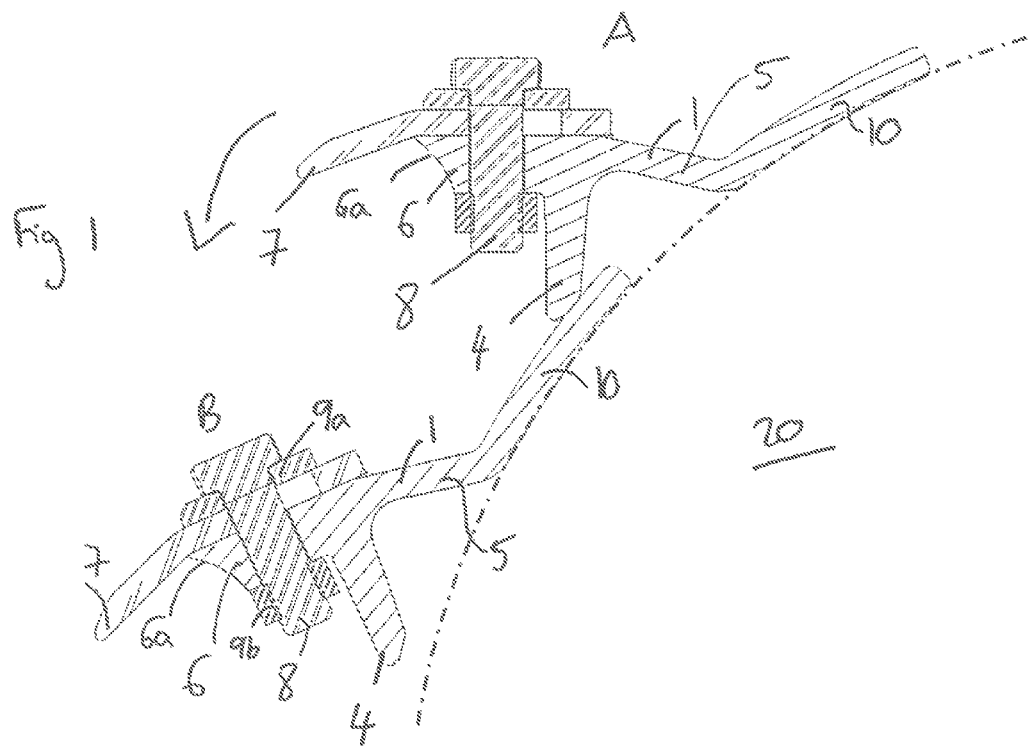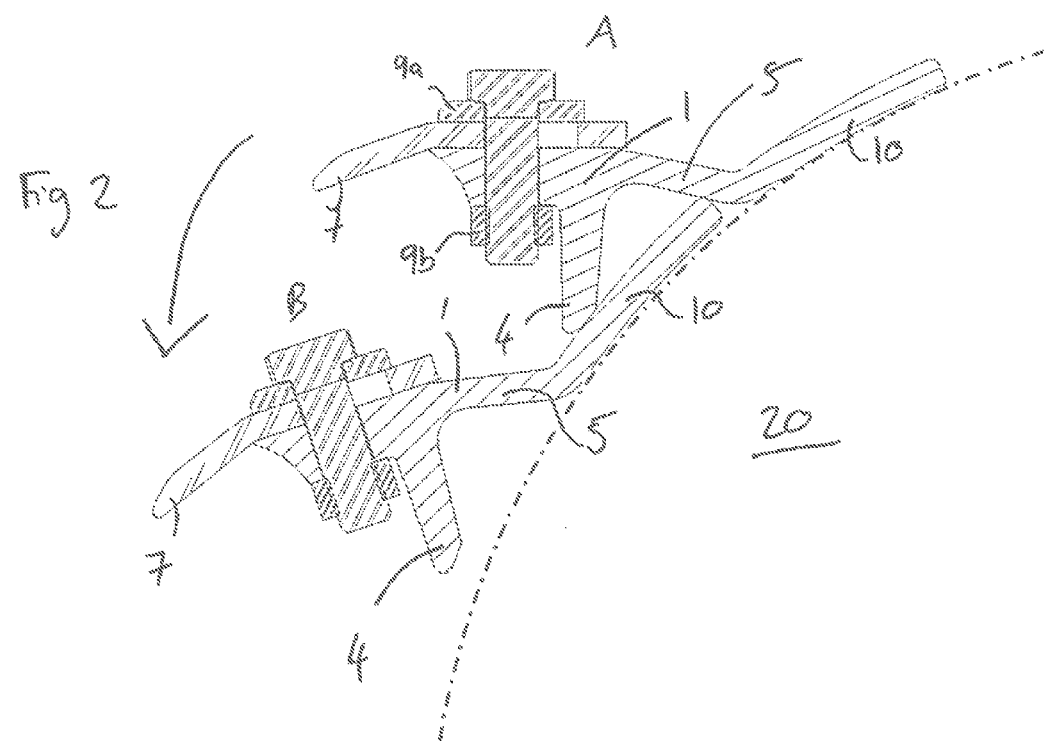

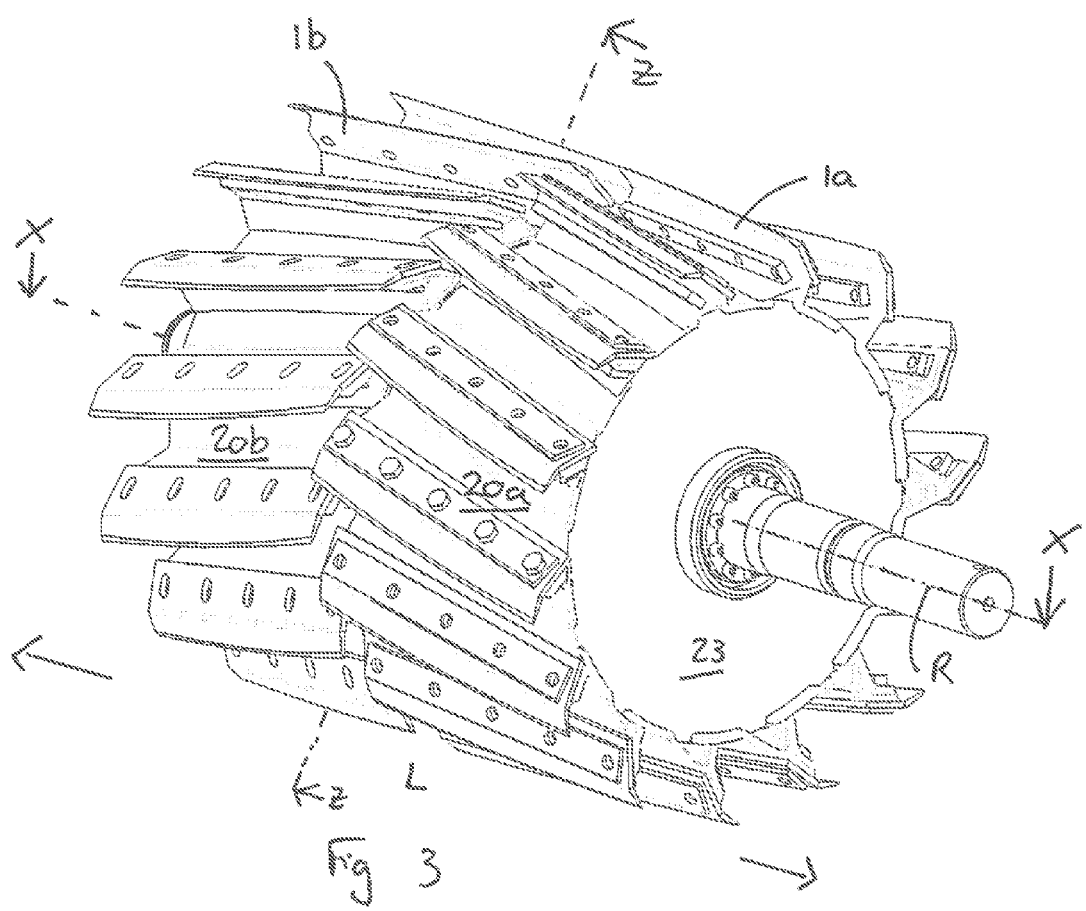

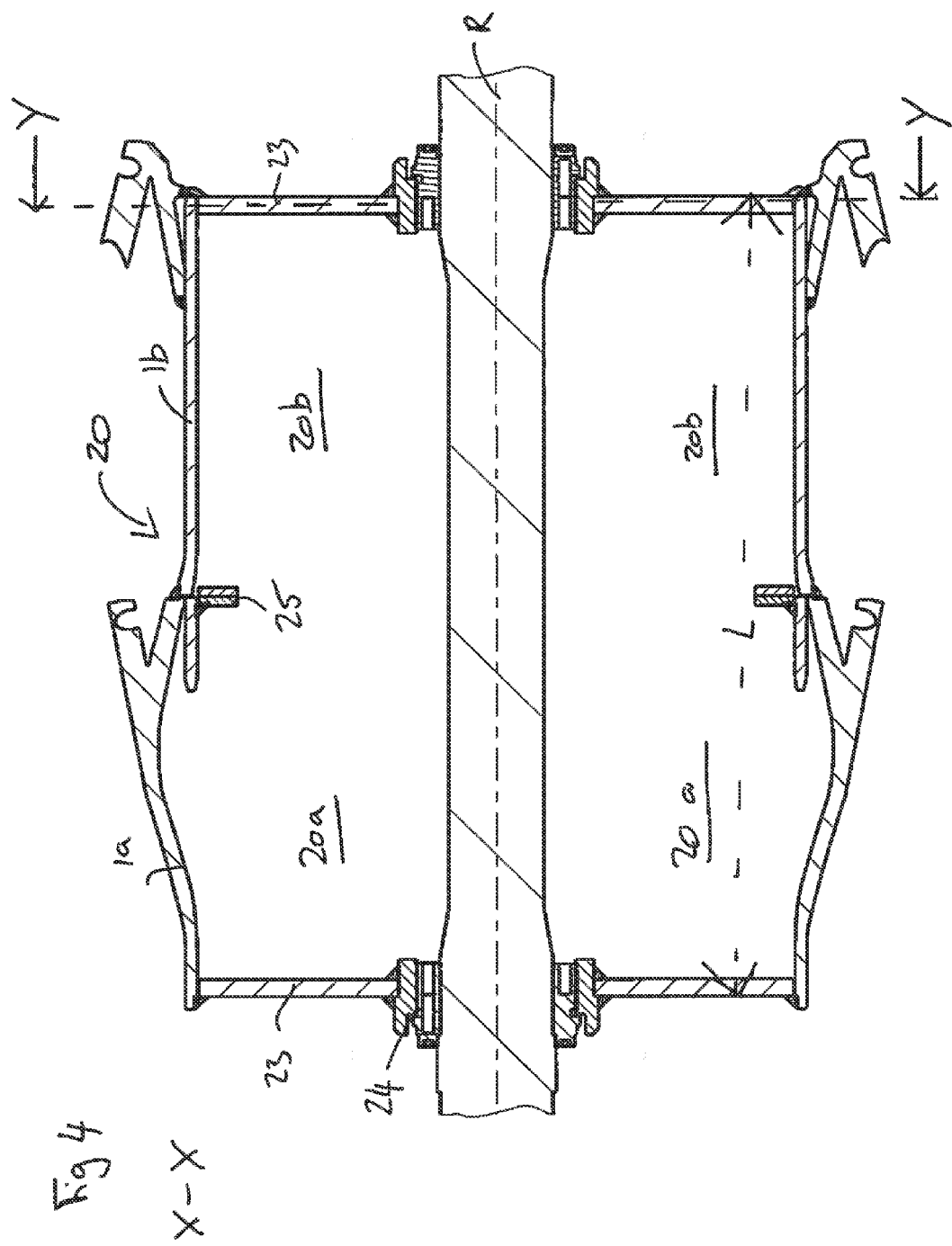

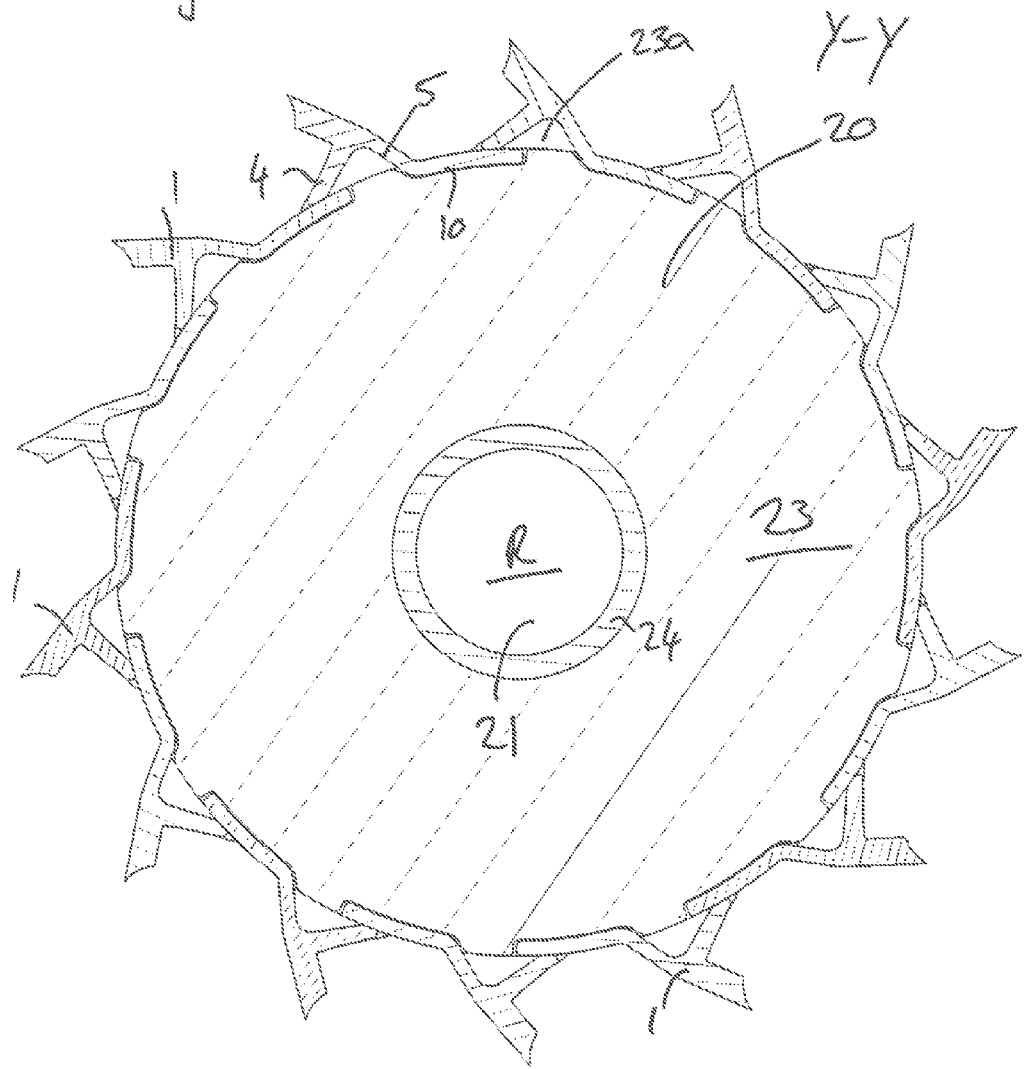

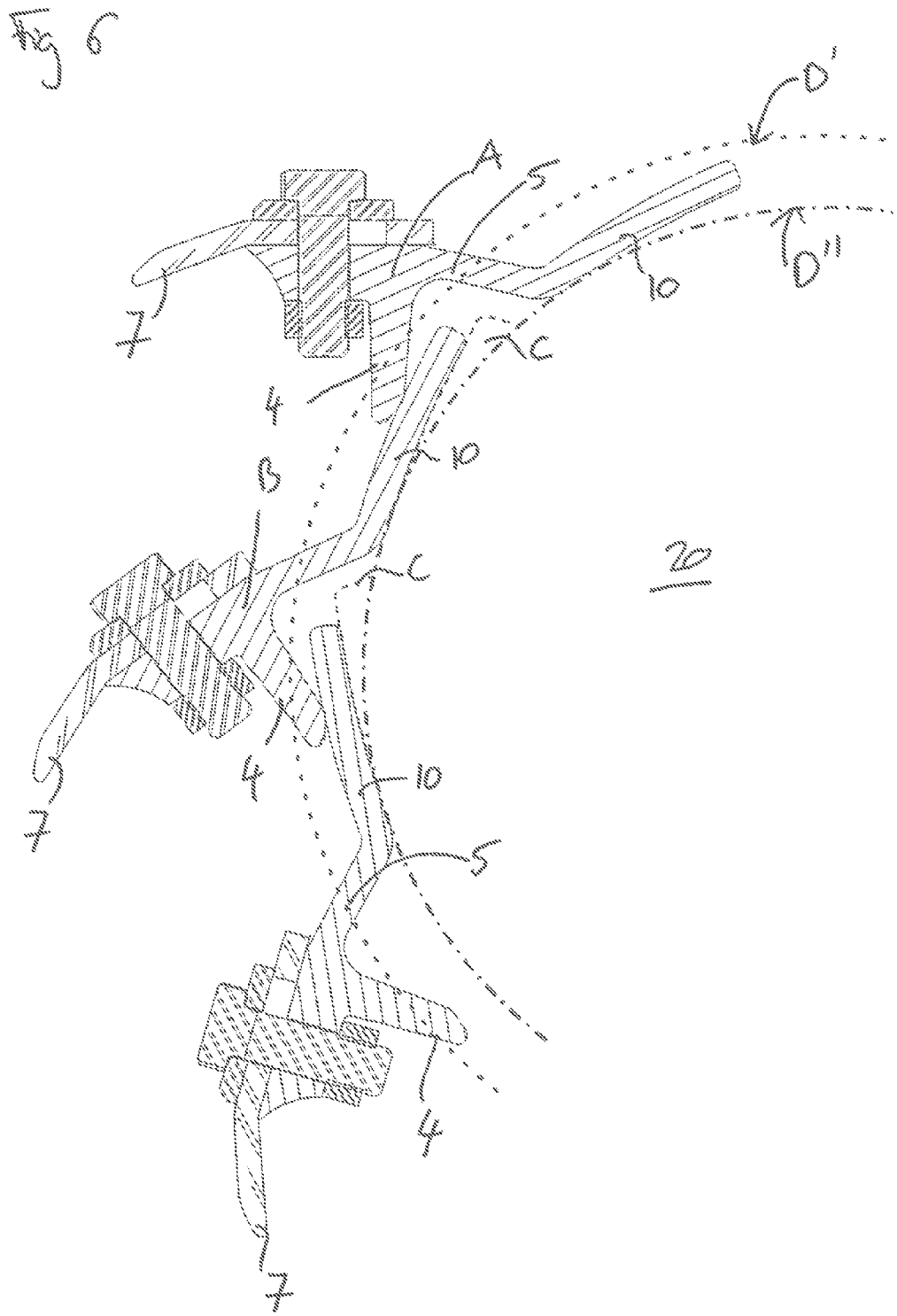

CUTTING DRUM FOR AGRICULTURAL MACHINE

Figure 7A:
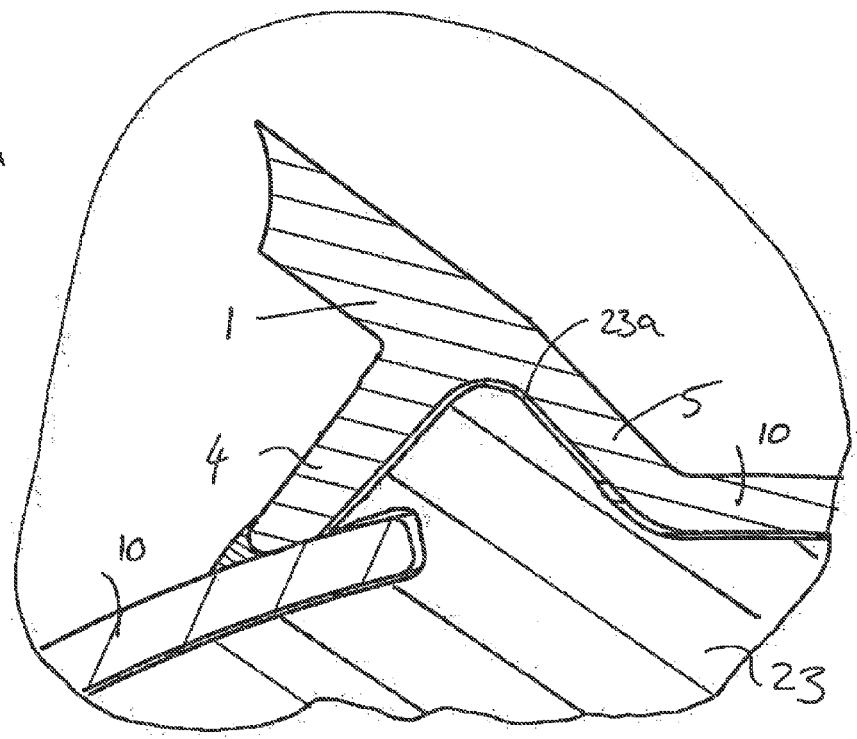

This invention relates to cutting drums for agricultural machines such as forage harvesters or combine harvesters. More specifically, the invention relates to the arrangement of knife holders on the drums.

A number of different types and configurations of knife holders on drums are known, as seen, for example in EP 0846412. This invention discloses the use of a scoop part between adjacent knife holders to prevent the amount of chopped crop which gets trapped between the holders. The holder arrangements described requires scoop parts of a defined length and therefore, if more, or fewer knife holders are required on a drum, for use with different crops, for example if the crop needs to be finely or coarsely chopped then different sized scoop parts must be fitted. This means that a farmer, or a machine supplier must have at least double the number of scoop parts to cater for the differing number of knife holders which may be fitted to the drum. Further, cutting drums known in the art comprise a cylindrical drum body to which the knife holders are attached to prevent crop passing into the cutting drum interior and becoming lodged inside. The drum body must provide a strong, rigid surface to which the knife holders are attached. Such a drum adds to the cost of the machine.

It is an object of the present invention to provide a knife holder which can be arranged with other knife holders to provide a closed drum surface, thus negating the need for a separate drum to provide a surface to which knife holders are attached. A further object of the present invention is to provide knife holders which can be arranged at varying distances to each other and reduce the amount of crop trapped between the holders without the need for further parts, or parts of differing dimensions. In this way, the number of knife holders and therefore knives on the drum can be increased and decreased without the need to have parts of differing dimensions. This in turn reduces costs and reduces the number of parts required.

According to the invention, there is provided a rotatable cutting drum as claimed in claim 1 of the attached claims.

This has the advantage that the knife holders form a drum surface reducing both the number of knife holder parts which are required and the need for a separate cutting drum.

It has the further advantage that the number of knife holders on the drum can be increased or decreased (thus increasing or decreasing the spacing between adjacent knife holders) when the forward member of one holder abuts the extension member an adjacent holder at a different position. Further holder parts of different dimensions are not required despite the change of spacing between the holders.

Preferred features of the invention are claimed in the dependent claims.

The knife holders preferably form a closed drum so that no underlying drum is required. Alternatively, the holders may be attached to a drum surface.

Preferably, the holder comprises cast steel and is cast as a single piece.

Alternatively, the knife holder comprises two sheet metal parts of constant thickness welded together to form the complete body of the knife holder.

Preferably, the extension member forms a portion of the drum surface.

The rear member preferably extends radially from the drum.

More preferably, the distance between the forward and rear member decreases towards the knife connecting portion.

Preferably, the knife connecting portion has a front part facing the direction of rotation which is concave. This assists in urging crop away from the drum.

Preferably, the forward member of a knife holder and the rear member of an adjacent knife holder form a shallow well between the knife holders, thus reducing the amount of crop which can be trapped between the holders.

Preferably, the number of knife holders on the drum is increased or decreased by altering the position of abutment of the forward member of one knife holder with the rear member of an adjacent knife holder.

The extension member of one knife holder may abut with both the forward and rear members of an adjacent knife holder. In this way the spacing between adjacent knife holders is minimised as much as possible and the maximum number of knives is fitted to the drum.

Alternatively, or additionally, the diameter of the drum is increased or decreased by altering the relative angle of an adjacent knife holder.

More preferably still, the end of the knife holder on the circumference of the drum is provided with a web which extends between the forward and rear members to prevent crop entering under the knife holder.

Figure 7B:
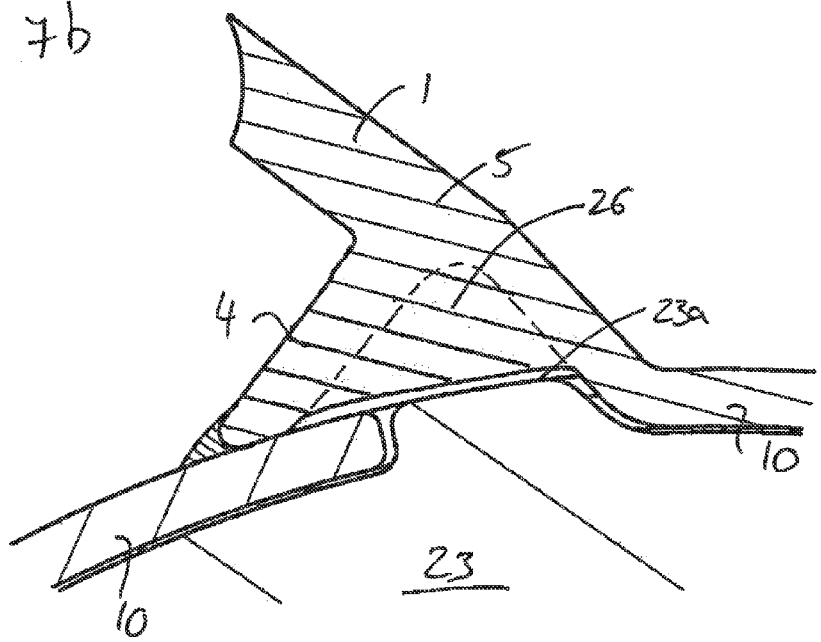

The invention will now be described, by way of example only, with reference to FIGS. 1 to 7 in which:

FIG. 1 is a partial cross sectional view of a drum taken along line Z-Z of FIG. 3 in accordance with the invention, FIG. 2 is a further partial cross sectional view of a drum taken along line Z-Z of FIG. 3 in accordance with the invention FIG. 3 is a perspective view of a drum in accordance with the invention, FIG. 4 is a cross sectional view of the drum of FIG. 3 along the line X-X, FIG. 5 is a cross sectional view of the drum of FIG. 4 along the line Y-Y, FIG. 6 is a yet a further partial cross sectional view of the drum and FIGS. 7a and 7b are yet further partial cross sectional views of the drum of FIG. 4 along line Y-Y.

FIGS. 1 and 2 show knife holders 1 which can be mounted to a rotatable drum 20, or which can be connected together to form a closed drum. By drum it is meant a symmetrical, hollow body and is not limited to such a body being cylindrical. Each knife holder 1 is fitted with a knife 3. The drum will rotate in the direction indicated by the arrow around its rotational axis R (see FIG. 3). Each knife holder 1 comprises a forward member 4, a rear member 5 and a knife connecting portion 6. In FIGS. 1 and 2, only two knife holders are shown, however more knife holders are usually equally spaced over the circumference of the drum. If no drum is present, more than two knife holders are connected to from a closed drum. A knife 7 is attached to the knife connecting portion 6 by means of a screw 8 and two bars 9a, 9b. Bar 9b is provided with threaded holes. The rear member 5 extends radially away from the rotational axis of the drum to the knife connecting portion 6 and is angled at the same or similar gradient to that of the surface of the knife connecting portion 6. The forward member 4 extends from the connecting portion towards the rotational axis until it abuts with the extension member of an adjacent member. The term adjacent holder is used to describe holder A with reference to holder B, or holder B with reference to holder A, that is a neighbouring holder as taken in the direction of rotation of the drum, or in an opposite direction of rotation of the drum. The distance between the forward and rear members decreases towards the knife connecting portion. The rear member 5 has an extension member 10 which is slightly curved, preferably having the same radius as that as the outer surface of the drum 20 (if present) so that when the rear leg touches the drum surface, the extension member 10 fits over a portion of the drum surface. The extension member 10 has the effect of making the space, or well between adjacent knife holders less deep which reduces the amount of crop which can be trapped in between. With reference to knife holder A, the forward member 4 extends from the knife connecting portion 6 forwardly in the direction of the rotation of the drum and towards rotational axis of the drum R to abut with extension member 10 of an adjacent knife holder B which is positioned in front of knife holder A as regarded in the direction of rotation of the drum 20. The forward members 4 may be secured to the extension members 10 by welding.

Forward member 4 and rear member 5 may be comprise two steel plates of constant thickness which are bent and welded together at the junction of the forward member 4 with the rear member 5.

Each knife connection portion 6 of each holder 1 has a forward face 6a as regarded in the direction of rotation of the drum which is provided with a concave surface which curves inwards towards the knife connection portion 6 to urge chopped crop away from the drum to prevent it becoming trapped between the holders.

In FIG. 1, the knife holders are shown widely spaced apart so that forward member 4 abuts with the end of extension member 10. With this formation, drums of around 720 mm in diameter can have around 28 knife holders fitted to the drum, or in case of no underlying drum, 28 holders can be fitted to each other to form a drum of the same size. In FIG. 2, the knife holders are shown closely spaced apart with the extension member of one holder B abutting with both forward member 4 and the inside of rear leg 5 of an adjacent holder A. On drums of around 720 mm in diameter, around 40 knife holders can be fitted in this configuration. Likewise, if no underlying drum is present, 40 knife holders can be overlapped to form a drum of the same size. Knife holders 1 can also be connected so that the spacing between adjacent holders is between the sizes of those shown in FIGS. 1 and 2, so long as a forward member of one holder abuts with a part of the extension member of an adjacent holder. In this way, different numbers of knife holders at a variety of spacings can be fitted to the drum as required without any need for further holder parts of different dimensions.

Since extension member 10, rear member 5 and forward member 4 overlap with the extension member 10 of an adjacent knife holder, a closed, or partially closed drum surface can be formed without the need for a separate drum underneath the knife holders. In this way, the extension members 10 of the knife holders 1 form a closed surface with forward members and rear members 4, 5. If the extension member 10 of one holder does not abut with the rear member 5 of an adjacent holder, the surface formed will not be smooth as viewed from the inside of the drum, however, it will have the form of a closed drum because both the undersides of forward member 4 and rear member 5 will form the drum surface. If the extension member 10 of one holder abuts with the rear member 5 of an adjacent holder, then the surface of the drum formed as viewed from the inside will be smooth as the extension member 10 will from a continuous circumference with the rear member 5 and extension member 10 of an adjacent holder.

In FIGS. 1 and 2, the knife holders 1 are attached to the drum 20 (if present) by welding. The extension members 10 can be bolted, or screwed to the drum 20.

FIGS. 3 and 5 show the arrangement of knife holders which are mounted on a drum 20. The drum 20 comprises two equal parts 20a, 20b, each of which is half the length of the total length L of the drum 20. By length of the drum, it is meant the distance L along the rotational axis R from the outer edge of one end of the drum to the outer edge of the opposite end of the drum 20. Parts 20a, 20b are provided with support elements 25, as shown in FIG. 4 which can be welded together along the circumference of the drum at the mid point of the length L to form a drum 20. Alternatively, the parts 20a, 20b can be screwed together. Having two parts 20a, 20b means that only one drum part 20a, or 20b must be replaced if damaged rather than the entire drum. Two knife holders are positioned to extend across the length of the drum L, each holder fitted to a respective drum part 20a, 20b. One knife holder 1a extends from a drum disc 23 fitted at an outer edge of drum part 20a to a mid point, halfway along the length L of the drum. A second knife holder 1b extends from another drum disc 23 fitted at an outer edge on drum part 20b to a mid point, halfway along the length of the drum L. Drum discs 23 are fitted to prevent harvested material from entering the drum 20 and are shown in FIGS. 4 and 5.

Each knife holder 1a, 1b extends from a position on each respective drum disc 23 to a position at the other end of the drum part 20a, 20b. The two positions on each drum part 20a, 20b are not directly opposite each other so that the knife holders 1a,1b are not parallel to the rotational axis R of the drum 20. Holders 1a and 1b may also be off set with respect to each other as shown in FIG. 3.

The drum 20 is driven by the belt system of a harvesting machine, such as a forage harvester (not shown) by a shaft 21. As seen in FIG. 5, the shaft 21 is rotationally fixed to a drum welding assembly which comprises two lateral discs 23 at opposing ends of the drum 20. One disc 23 is attached to drum part 20a and the other disc 23 is attached to the drum part 20b. Each disc 23 is provided with a centre bushing 24 for connection with the shaft 21.

The knife holders 1a, 1b can also be welded together where the two drum parts 20a, 20b meet if they are not off set with respect to each other. Support element 25 can also welded to each knife holder 1a, 1b to give further structural support.

If the knife holders are not fixed to the drum 20 and instead are connected to each other to form a closed drum, the knife holders 1a, 1b are each welded to each other and each holder is welded to one of the discs 23. Extension member 10 is provided with a curved contour 10a with a radius similar to the radius of discs 23. In an alternative arrangement, a single knife holder may extend across the length of a drum instead of having two holders 1a, 1b.

Additionally, whether the drum is formed from the holders, or the holders are mounted on a drum, the extension members 10 can be welded to the forward members 4 of adjacent knife holders to provide a stronger structure.

FIG. 4 is a cross sectional view of FIG. 3 along the rotational axis R, along line X-X of FIG. 3 with no knifes attached. The support elements 25 of a drum 20 comprising two drum parts 20a, 20b are clearly shown. These elements along the circumference of each drum part project towards the rotational axis of the drum.

FIG. 6 shows a further configuration of drum 20 having a different drum diameter compared to the configurations shown in FIGS. 1 and 2.

In FIG. 6 adjacent knife holders A, B are the same as those in FIGS. 1 and 2 and the extension members rest tangentially to the surface D" of the drum 20. Depending on where the forward member 4 of one holder A abuts with the extension member of an adjacent holder B affects the angle of the forward member 4 relative to the drum surface D". This in turns affects the distance of an attached knife from the drum surface. It can be seen that if the distance between holders A and B is increased across the surface of the drum D" the forward member 4 will abut extension member 10 at a distance further away from knife connecting portion 6 than that currently shown in FIG. 6. Such an abutment will occur at dotted line D' which is at a greater distance away from surface D" than the position shown FIGS. 1 and 2 and thus increase the distance from the drum surface to the knife connecting portion 6. If the knife holders are connected without a drum 20 present, a closed drum 20 with a smaller or larger diameter can be formed depending where on the extension member 10, the forward member 4 abuts with it. Discs 23 may be of a diameter to provide a good contact surface with the knife holders 1 at the front edge of the discs 23 and therefore provide a sufficient surface for welding. The support element 25 may only partly be in contact with the knife holders.

The inside surface formed by adjacent knife holders A, B may be a non-circular peripheral surface as shown with line C in FIG. 6. A gap 23a can form between discs 23 and knife holder 1 at each end of the drum as shown in FIG. 5. Crop can enter the interior of drum 20 through gap 23a and get trapped in the drum. Discs 23 at each end of the drum maybe shaped to fit into the gap 23a to close it to prevent this happening. In one arrangement as shown in FIG. 7a, the drum disc 23 is extended to close the gap 23a between forward member 4 and rear member 5 under the knife holder 1. In the same manner, support part 25 may be adapted to fit into gaps between the knife holders 1.

Alternatively and preferably, the ends of knife holders 1 on the circumference of the drum which are attached to discs 23a may be provided with a rib, or web 26 as shown by the dotted line in FIG. 7b. The rib, or web 26 extends between forward member 4 and rear member 5 and covers the gap 23a under knife holder 1. The rib or web 26a may extends towards disc 23a, to block gap 23a. Both of these arrangements provide a closed drum structure, both circumferentially and laterally.

The invention claimed is:

1. A rotatable cutting drum comprising knife holders for attaching cutter knives thereto, each knife holder comprising a knife holder body formed by a forward member and a rear member and a knife connecting portion, said rear member extending from the connecting portion towards the rotational axis of the drum and having an extension member which extends circumferentially of the rotational axis in a direction opposite to the direction of rotation of the drum, said forward member extending from the connecting portion towards the drum rotation axis and abutting with the extension member of an adjacent knife holder positioned forward of said knife holder in the direction of rotation of the drum so that the number of knife holders on the drum is increased or decreased by altering the position of abutment between the forward member of one knife holder and the rear member of an adjacent knife holder.

2. The rotatable cutting drum as claimed in claim 1 wherein the knife holders form a closed drum.

3. The rotatable cutting drum as claimed in claim 1 wherein each knife holder is cast as a single piece.

4. The rotatable cutting drum as claimed in claim 1 wherein each knife holder comprises two sheet metal parts of constant thickness welded together to form the complete body of the knife holder.

5. The rotatable cutting drum as claimed in claim 1 wherein the extension part forms part of the drum surface.

6. The rotatable cutting drum as claimed in claim 1 wherein the rear member extends radially from the drum.

7. The rotatable cutting drum as claimed in claim 1 wherein the distance between the forward and rear member of the knife holder decreases towards the knife connecting portion.

8. The rotatable cutting drum as claimed in claim 1 wherein the knife connecting portion has a front part facing the direction of rotation which is curved towards the forward member.

9. The rotatable cutting drum as claimed in claim 1 wherein the diameter of the drum is increased or decreased by altering the relative angle of an adjacent knife holder.

10. The rotatable cutting drum as claimed in claim 1 wherein the extension member of one knife holder abuts with both the forward and rear members of an adjacent knife holder.

11. The rotatable cutting drum as claimed in claim 1 wherein the knife holders are attached to a drum structure.

12. The rotatable cutting drum as claimed in claim 1 wherein an end of the knife holder on the circumference of the drum is provided with a web which extends between the forward and rear members to prevent crop entering under the knife holder.

13. The rotatable cutting drum as claimed in claim 1 wherein the knife connecting portion extends from the connection with the forward member and the rear member, the knife connecting portion extending generally in the direction of rotation of the drum.

14. The rotatable cutting drum as claimed in claim 1 wherein the forward portion of a knife holder is attached to the extension member of an adjacent knife holder.

15. The rotatable cutting drum as claimed in claim 1, wherein the rotatable cutting drum comprises an internal drum, and wherein the extension member of the knife holder is attached to the surface of the internal drum.

* * * * *